United States Patent
Rajabathar et al.

(10) Patent No.: US 10,204,745 B1
(45) Date of Patent: Feb. 12, 2019

(54) METHOD OF MAKING A SUPERCAPACITOR USING POROUS ACTIVATED CARBON FROM COW DUNG

(71) Applicant: KING SAUD UNIVERSITY, Riyadh (SA)

(72) Inventors: Jothi Ramalingam Rajabathar, Chennai (IN); Hamad Abdullah Al-Lohedan, Riyadh (SA); Judith J. Vijaya, Chennai (IN); M. Sivachidambaram, Chennai (IN)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 15/960,388

(22) Filed: Apr. 23, 2018

(51) Int. Cl.
| | |
|---|---|
| H01G 9/00 | (2006.01) |
| H01G 11/00 | (2013.01) |
| H01G 11/34 | (2013.01) |
| C01B 32/324 | (2017.01) |
| H01G 11/26 | (2013.01) |
| H01G 11/58 | (2013.01) |
| H01G 11/52 | (2013.01) |
| H01G 11/86 | (2013.01) |

(Continued)

(52) U.S. Cl.
CPC .......... *H01G 11/34* (2013.01); *C01B 32/324* (2017.08); *H01G 9/0032* (2013.01); *H01G 9/022* (2013.01); *H01G 9/04* (2013.01); *H01G 11/26* (2013.01); *H01G 11/52* (2013.01); *H01G 11/58* (2013.01); *H01G 11/74* (2013.01); *H01G 11/86* (2013.01); *H01G 2009/0025* (2013.01)

(58) Field of Classification Search
CPC ........ H01G 11/34; H01G 11/26; H01G 11/52; H01G 11/58; H01G 11/74; H01G 11/86; H01G 9/0032; H01G 9/022; H01G 9/04
See application file for complete search history.

(56) References Cited

U.S. PATENT DOCUMENTS

2009/0052117 A1 * 2/2009 Cadek .............. H01G 11/34
361/503

FOREIGN PATENT DOCUMENTS

| CN | 104843685 A | 8/2015 |
| CN | 106207135 A | 12/2016 |

(Continued)

OTHER PUBLICATIONS

Bhattacharja, D. et al., "Activated carbon made from cow dung as electrode material for electrochemical double layer capacitor", Journal of Power Sources (2014), vol. 262, pp. 224-231.

*Primary Examiner* — Seahvosh Nikmanesh
(74) *Attorney, Agent, or Firm* — Richard C. Litman

(57) ABSTRACT

The method of making a supercapacitor using porous activated carbon from cow dung includes converting cow dung to porous activated carbon by, in a first step, preparing the dung waste by washing and drying the dung waste, and heating the dung waste in a vacuum environment to form pre-carbonized carbon. In a second step, the pre-carbonized carbon is impregnated with phosphoric acid to form a slurry, which is dried, ground, and heated in a vacuum to between 600-900° C. to form porous activated carbon. The porous activated carbon is mixed with a binder, acetylene black, and an organic solvent to form a paste, which is dried on a conductive metal foil to form an electrode. Two such electrodes (an anode and cathode) are coated with an electrolyte gel (e.g., aqueous potassium hydroxide) and separated by a polymer (e.g., PTFE) membrane to form the supercapacitor.

14 Claims, 15 Drawing Sheets

(51) Int. Cl.
*H01G 11/74* (2013.01)
*H01G 9/04* (2006.01)
*H01G 9/022* (2006.01)

(56) References Cited

FOREIGN PATENT DOCUMENTS

CN 106207136 A 12/2016
JP 2000340270 A 12/2000

* cited by examiner

METHOD OF MAKING A SUPERCAPACITOR USING POROUS ACTIVATED CARBON FROM COW DUNG

BACKGROUND

1. Field

The disclosure of the present patent application relates to supercapacitors, and particularly to a method of making a supercapacitor using porous activated carbon from cow dung as electrode material.

2. Description of the Related Art

Human population growth creates a scarcity in various fields, such as water, land and energy, which leads to anticipation that they are unable to survive properly in day-to-day life. One issue is that human society faces substantial scarcity of electricity, creating a need for high electrical energy storage devices. Conventional energy storage systems include batteries, solar cells and fuel cells. Batteries have high energy density with low power density and a short cyclic life.

Waste products are often a form of pollution, which needs to be controlled. Previous techniques to control the pollution obtained from the natural organic solid waste address jackfruit peel waste, *Borassus flabellifer* (doub palm or Palmyra palm) flower, rice straw, corn stalk (corn silage) and cattle dung waste (CDW). In general, cattle dung, as a waste product, needs to be harvested, used in-situ as fertilizer, or otherwise controlled.

Supercapacitors provide a potential power device for efficient sustainable energy storage devices and electric vehicles. Supercapacitors typically comprise electrochemical double-layer capacitors (EDLCs) that can deliver high power density and greater cyclic duration than batteries. The high power density is due to their charge storage mechanism, which is based on the surface reactions between the electrolyte and electrode materials. Consequently, EDLCs afford an alternative energy storage device to rechargeable batteries, especially where high power density is required.

In comparison, rechargeable batteries have higher energy density than supercapacitors, and many researchers put efforts to enhance their energy density in supercapacitors. Supercapacitors are able to store substantially more energy per unit volume than electrolytic capacitors, are able to transfer energy (in the form electrical charge) faster than rechargeable batteries, and can tolerate more charge/discharge cycles than rechargeable batteries.

Generally, it is known that the energy density of EDLCs depends upon the specific capacitance of electrode materials and cell voltage present in electrochemical cell configuration. Accordingly, the energy density is increased to develop a porous and nano-sized electrode material to improve the specific capacitance. In recent years, many researchers made an effort to progress some nanostructured porous electrode materials to reduce the ionic diffusion path length in order to increase the surface area, which also improves the performance of EDLCs.

An EDLC is typically formed from two porous electrodes made of carbon or other materials, or two metal plates coated with porous material, with an electrolyte separating the electrodes. When voltage is applied, the electrodes and electrolyte form two separate interfaces having opposite charges.

EDLCs use carbon electrodes or derivatives and provide much higher electrostatic double-layer capacitance than electrochemical pseudocapacitance, achieving separation of charge in a Helmholtz double-layer at the interface between the surface of a conductive electrode and an electrolyte.

Several nanostructured electrode materials have been developed, such as nano-metal oxides, nanocomposites, and nano-carbonaceous materials. Examples of nano-carbonaceous materials are porous activated carbons (PAC), carbon nanotubes and carbon aerogels. Among electrode materials, PAC materials have a large surface area, which delivers high electrochemical double-layer formation, and which are less expensive to synthesize. Thus, a method of making a supercapacitor using porous activated carbon from cow dung solving the aforementioned problems is desired.

SUMMARY

The method of making a supercapacitor using porous activated carbon from cow dung includes converting cow dung to porous activated carbon by, in a first step, preparing the dung waste by washing and drying the dung waste, and heating the dung waste in a vacuum environment to form pre-carbonized carbon. In a second step, the pre-carbonized carbon is impregnated with phosphoric acid to form a slurry, which is dried, ground, and heated in a vacuum to between 600-900° C. to form porous activated carbon. The porous activated carbon is mixed with a binder, acetylene black, and an organic solvent to form a paste, which is dried on a conductive metal foil to form an electrode. Two such electrodes (an anode and cathode) are coated with an electrolyte gel (e.g., aqueous potassium hydroxide) and separated by a polymer (e.g., PTFE) membrane to form the supercapacitor.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
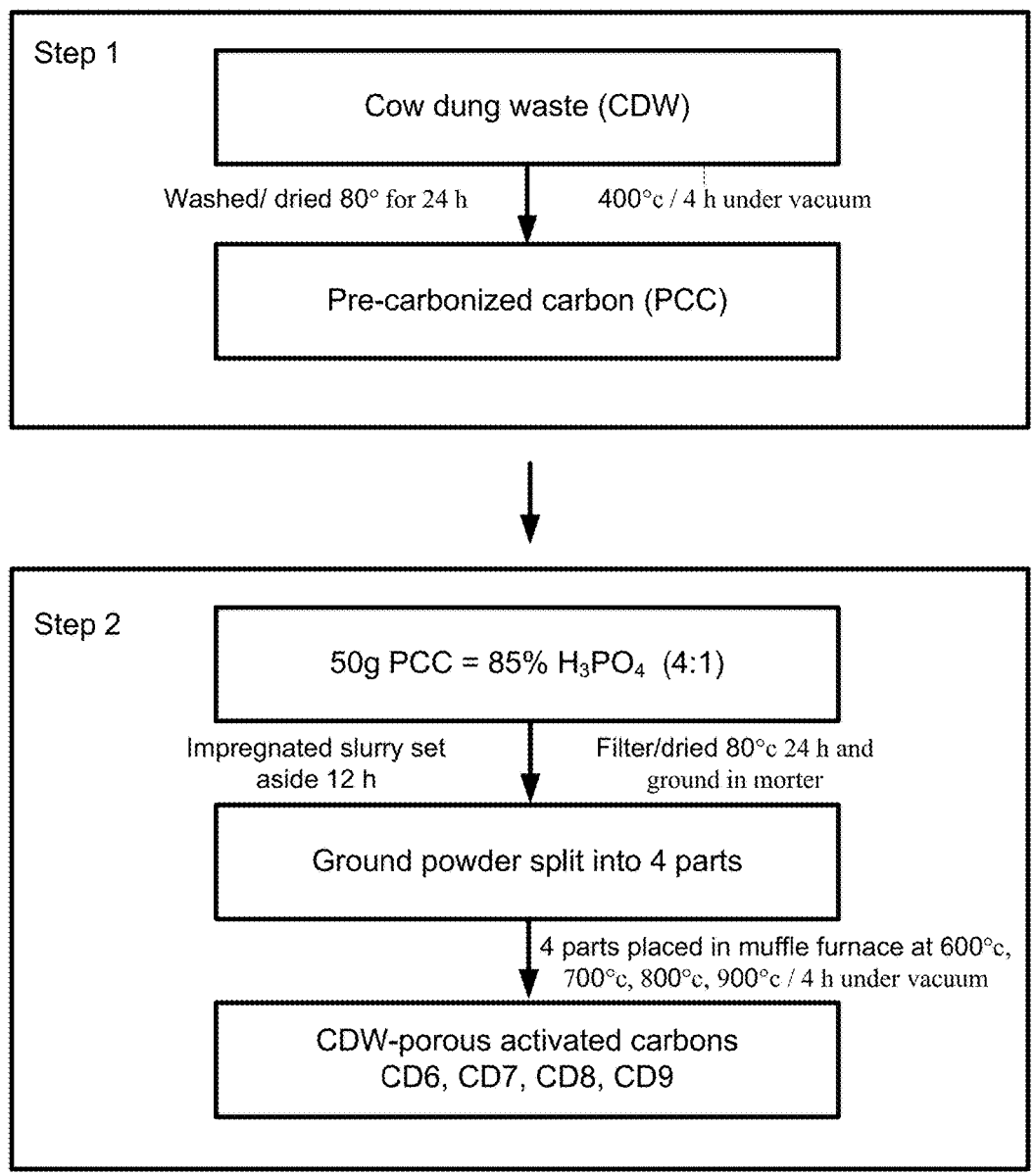
FIG. 1 is a chart showing the preparation of porous activated carbon (PAC) from cow dung waste (CDW).

The method of making a supercapacitor using porous activated carbon from cow dung includes converting cow dung to porous activated carbon by, in a first step, preparing the dung waste by washing and drying the dung waste, and heating the dung waste in a vacuum environment to form pre-carbonized carbon. In a second step, the pre-carbonized carbon is impregnated with phosphoric acid to form a slurry, which is dried, ground, and heated in a vacuum to between 600-900° C. to form porous activated carbon. The porous activated carbon is mixed with a binder, acetylene black, and an organic solvent to form a paste, which is dried on a conductive metal foil to form an electrode. Two such electrodes (an anode and cathode) are coated with an electrolyte gel (e.g., aqueous potassium hydroxide) and separated by a polymer (e.g., PTFE) membrane to form the supercapacitor.

As described below, various PACs were made at different activation temperatures between 600° C. and 900° C. by using cattle dung waste (CDW) as a precursor using a chemical activation method, including a chemical activation agent. In particular, phosphoric acid ($H_3PO_4$) is used as the activating agent. The as-prepared PAC is amorphous and graphitic in nature, which is confirmed by X-ray diffraction studies. Morphology of the CDW-PAC nanoporous structures is studied in high resolution scanning electron microscopy and high resolution transmission electron microscopy, which reveals the nano spongy structure with very tiny spherical nanoporous morphology. In a test sample, $N_2$ adsorption-desorption isotherms show very high specific surface area of 2457 $m^2/g$ (for sample CD 9, described below) with large pore volume of 1.965 $cm^3/g$. Electrochemical measurements of sample CD 9 shows good specific capacitance (Cs) of 347 F/g at a small scan rate (5 mV/s), with better cyclic stability, which is run up to 5000 cycles at low current density (0.5 A/g). The disclosed technique can be used to make a device called flexible type symmetric supercapacitor. Electrochemical tests were done for a supercapacitor made with the sample CD 9 porous activated carbon, which shows the Cs value of 208 F/g and capacitance retention up to 91%.

The flexible type symmetrical supercapacitor includes: a nickel foil anode and cathode; an electrolytic gel; a PTFE separator, and cattle dung waste-based porous activated carbon layers between the electrodes and the electrolytic gel.

The disclosed technique may include washing the cattle dung waste several times; drying at 80° C. for 24 hours; heating in a muffle furnace at 400° C. for 4 hours under vacuum; agitating with 85% $H_3PO_4$; filtering the acidified waste; and drying at 80° C. for 24 hours. The dried slurry is ground in a mortar and placed in a muffle furnace at 600 to 900° C. for 2 hours under vacuum. The samples are then washed several times with cold water to remove the activating agent and to maintain a neutral pH value.

In order to use a natural organic solid waste, the cattle dung waste material was chosen to prepare the PAC. Cattle dung is low cost and provides a large surface area.

PAC is generally prepared from two activation methods, which are physical and chemical. Chemical activation is generally preferred when preparing hierarchical PAC, because it delivers a large surface area and we can use simple chemical activating agents under vacuum conditions.

Supercapacitors can be divided into two types, namely symmetric and asymmetric devices. In a symmetric supercapacitor, there is positive (anode) and negative (cathode) electrodes made up of similar active materials. An asymmetric supercapacitor has different active materials in the positive and negative electrodes. Hence, the described technique is for a device fabrication of a flexible-type symmetric supercapacitor (FT-SS) using an electrode material prepared from CDW-PAC, in which the as-prepared PAC is prepared by chemical activation method using $H_3PO_4$ as an activating agent.

Example 1

Preparation of Porous Activated Carbon (PAC)

Cattle dung waste (CDW) was collected from nearby villages in Villupuram district, Tamil Nadu, and Chennai, India. The CDW was used as a precursor material to prepare PAC in a two-step process. In the two-step process, the first step is the pre-carbonization process and second step is the chemical activation process.

FIG. 1 is a chart showing the preparation of CDW porous activated carbons (CDW-PAC).

In the first step, the precursor material cattle dung waste was washed several times and dried at 80° C. for 24 hours to remove impurities, such as sand and moisture content. The dried sample is weighed approximately and placed in a muffle furnace at 400° C. for 4 hours using a clay-sealed graphite crucible to create vacuum environmental conditions, and is identified as pre-carbonized carbon (PCC). The vacuum should be sufficient negative pressure to allow the CDW to form the PCC.

In the next step, 50 g of PCC is agitated with 85% $H_3PO_4$ (concentrated ortho-phosphoric acid) with the impregnation ratio of 4:1 PCC:acid wt/wt to form a slurry. The impregnated slurry was kept aside for 12 h, filtered and dried at 80° C. for 24 h. The dried slurry was ground in a mortar and divided into four parts. The four parts were placed in a muffle furnace at four different temperatures, namely, 600, 700, 800, and 900° C., respectively, for 2 hours using a clay sealed graphite crucible to provide vacuum environmental conditions. The four samples were labelled as CD 6, CD 7, CD 8 and CD 9, respectively. The slurry in the furnace was heated in the vacuum environmental conditions. Finally, the four different PAC samples CD 6, CD 7, CD 8 and CD 9 were washed several times with cold water to remove the activating agent and to maintain a neutral pH value.

Example 2

Fabrication of Supercapacitor

Figure 2:
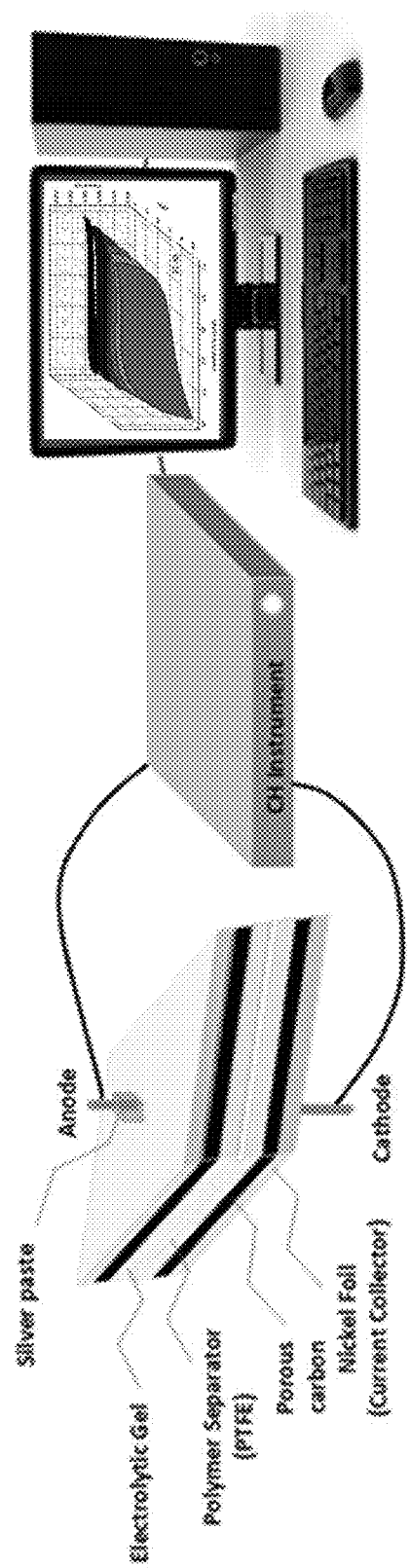
FIG. 2 is a diagrammatic environmental perspective view of a supercapacitor made with porous activated carbon prepared from cow dung waste.

In the diagrammatic design of an FT-SS, shown in FIG. 2, the FT-SS is implemented with seven layers. The first three layers are on the anode side and the second three layers are on the bottom of the cathode side. Between the three layers of anode and cathode is a seventh layer referred to as a separator. The first layer of the anode electrode is nickel foil (3×3 cm), which was used as a current collector. After forming the nickel foil, one side is coated by a silver paste at center point, which is used as a terminal for connectivity to a supply voltage. On the other side of the nickel foil is a CD 9 electrode, the sample CD 9 PAC (5 mg) being coated over the nickel foil using a binder poly(vinylidene)difluoride (2 mg) and an organic solvent, N-methylpyrrolidinone, to form a paste for adhering to the current collector.

The nickel foil can be made of any convenient size, as is appropriate for the particular EDLC application. Examples are 1×1 cm and 3×3 cm, as well as non-square, and non-polygonal shapes. The nickel foil can be substantially pure nickel or a nickel alloy. It is understood that other conductive materials can be used.

The third layer is a 6M KOH (potassium hydroxide) electrolytic gel, which acts as an electrolyte. Between the anode and cathode electrodes, a polymer (polytetrafluoroethylene or Teflon® membrane) layer is introduced as a separator. The 6M KOH electrolytic gel is made when the separator is soaked for 12 hours in 6M KOH aqueous electrolyte. Similarly, the cathode electrode is also made like a three layers of anode electrode.

X-ray diffraction patterns of the CDW porous activated carbon samples were recorded on a Shimadzu XD-3A (Japan) goniometer, using Cu Kα radiation operated at 40 kV and 35 mA. Surface morphology analysis of the CDW porous activated carbon samples were performed by using a Quanta 200 FEG high resolution scanning electron microscope (HRSEM) and a high-resolution transmission electron microscopy (HRTEM) from a FEI Tecnai G20 instrument. The adsorption-desorption isotherms were obtained using a Quantachrome Autosorb-1 volumetric analyzer and the specific surface area was determined by Brunauer-Emmett-Teller (BET) surface area analysis.

Example 3

Preparation of Sample Electrodes

Electrodes for testing the porous activated carbon (PAC) samples were prepared as follows. 4 mg of active material is added with 2 mg of poly(vinylidene)difluoride as binder and 2 mg of acetylene black is added to avoid the resistance present in the binder. An organic solvent, N-methylpyrrolidinone, is added to make a paste. The paste was coated on nickel foil to form a 1×1 cm foil form, which serves as a current collector. Finally, the coated nickel foil is dried for few minutes to cause the active material to adhere to the current collector. The electrochemical measurements cyclic voltammetry (CV), galvanostatic charge-discharge (GCD), electrochemical impedance spectroscopy (EIS) and cyclic stability (5000 cycles) were studied. Electrochemical tests of as-prepared CDW porous activated carbon electrode were measured by an Ametek PARSTAT 4000 instrument using a three-electrode system with 6M KOH aqueous electrolyte. In the three electrode system, one electrode is the working electrode (the as-prepared sample CD electrode), a second electrode is the counter electrode (a platinum electrode used to maintain electroneutrality in the electrochemical cell) and a third electrode is the reference electrode (Ag/AgCl). Sample electrodes for each of the four cow dung PAC samples (CD 6, CD 7, CD8, and CD 9) were prepared and used for the CV, GCD, and EIS testing described below.

Example 4

X-Ray Diffraction Studies of PAC Samples

Figure 3:
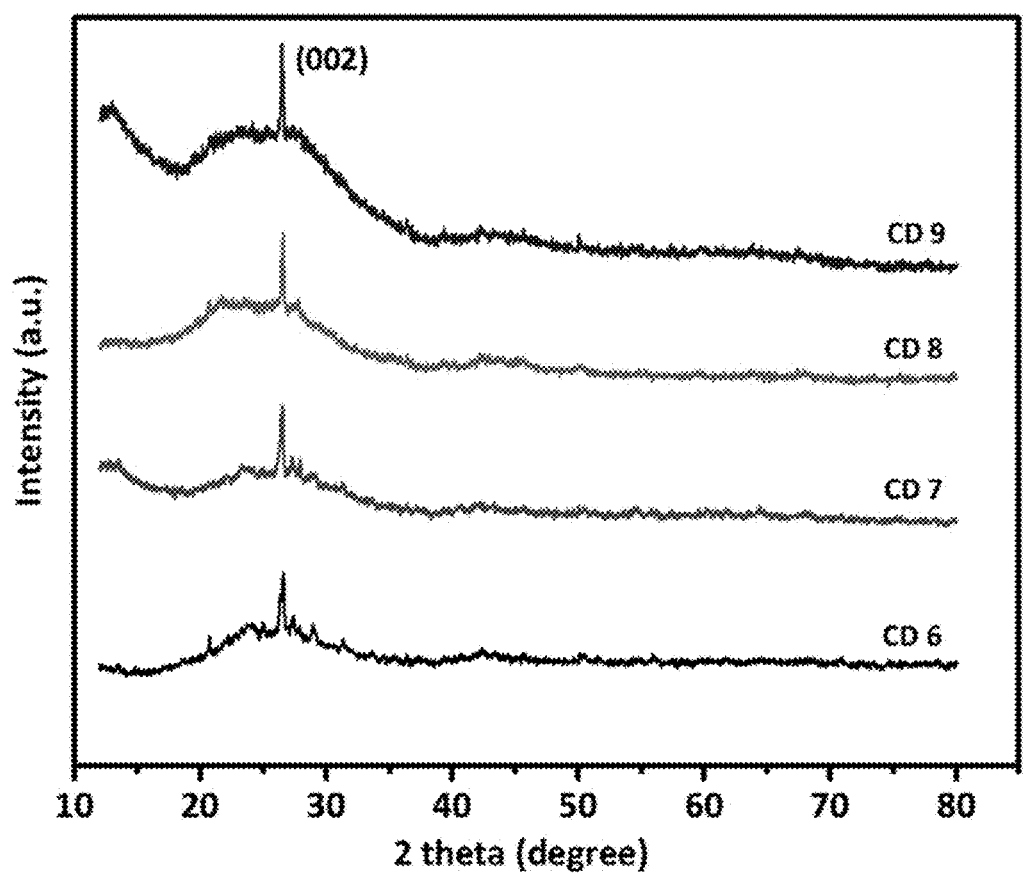
FIG. 3 is a plot of X-ray powder diffraction patterns for samples of porous activated carbon prepared from cow dung waste under different conditions.

FIG. 3 presents X-ray diffraction patterns of the PAC from cattle dung waste samples CD 6, CD 7, CD 8 and CD 9. In FIG. 3, the broad peak at 2θ value 23° and very little broad peak at 430 represent the amorphous nature of all the activated porous carbon samples. The corresponding Bragg's reflection plane is (100) and (101) respectively. The sharp peak at 26° presents in all of the activated porous carbon samples depicts the graphitic plane at (002). It will be seen that the sharp peak increases from CD 6 to CD 9, which indicates that the graphitic nature increases when the activation temperature increases. Overall, a more graphitic nature enhances the electrical conductivity of the porous carbons, and it replicates the higher capacitance of CD 9. The X-ray diffraction patterns at 2θ=23°, 43° and 26° match well with morphological studies, e.g., the JCPDS card number 75-2078.30 morphological study.

Example 5

Morphology of PAC Samples

Figure 4C:
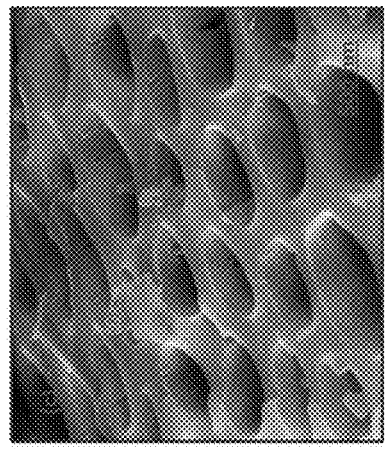
FIG. 4C is a HRSEM micrograph of porous activated carbon (PAC) sample CD 9.
Figure 4B:
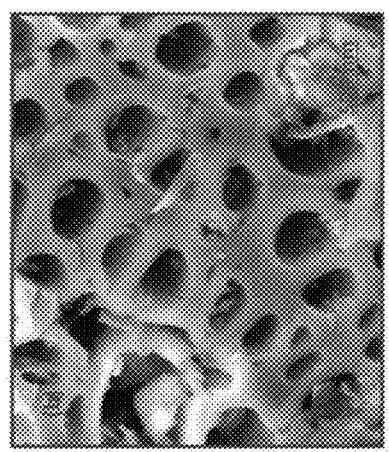
FIG. 4B is a HRSEM micrograph of porous activated carbon (PAC) sample CD 6.
Figure 4A:
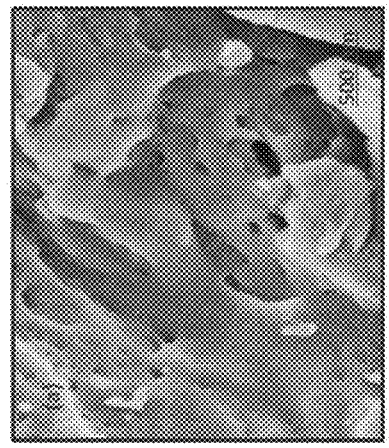
FIG. 4A is a high resolution scanning electron microscopy (HRSEM) micrograph of pre-carbonized carbon (PCC).

FIGS. 4A 4C are HRSEM micrographs of CDW-PAC. FIG. 4A shows an as-prepared CDW (PCC) porous activated carbon with a rough surface and the absence of porosity. The number of pores on the surface of the CDW porous activated carbon sample CD 9 is much more than for CD 6, as shown in FIGS. 4B and 4C.

The number of pores appears to increase with an increase in the activation temperature in the activation processes. The creation of new pores is caused by the activating agent ($H_3PO_4$) and it burns the carbon to form the pores. In FIG. 4B, CD 6 depicts the hierarchical pores with a less evenly arranged pattern than CD 9. This indicates that CD 6 has both micro and mesoporous characteristics that render an even pore pattern. Comparatively CD 9, shown in FIG. 4C, has enlargements in its pores and both micro and mesoporous structures arranged to create a stable Helmholtz double-layer. Similarly, CD 6 exhibits a smoother surface and less degree of porosity, when compared to CD 9. This appears in FIG. 4B, which shows the presence of hierarchical pore structure and irregular pores. The differences may be attributed to the contribution of $H_3PO_4$, which reacts both with the interior and exterior surface of the CD 9, thus creating more pores on the surface. Cylindrical-like pores are exhibited for CD 9 and shown in FIG. 4C. More porous creation enhances the BET surface area, and it is evident from the results of $N_2$ adsorption-desorption isotherm analysis (Table 1). Also, the CD 9 sample exhibits the arrangement of pore channels, which are interconnected with other pore channels, as shown in FIG. 4C. The interconnected channels provide a fast charge transfer in electrolyte solution to the electrode materials, and it is a promising one for EDLCs.

Figure 4F:
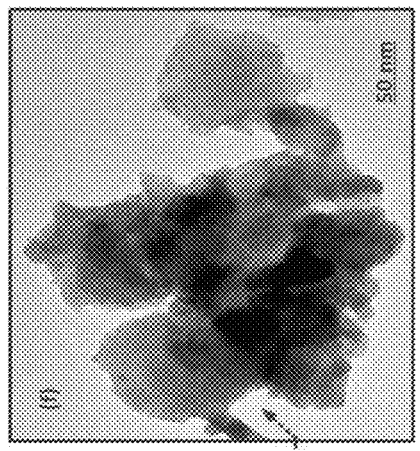
FIGS. 4D, 4E, and 4F are high resolution transmission electron microscopy (HRTEM) micrographs of samples of PAC CD 9.
Figure 4E:
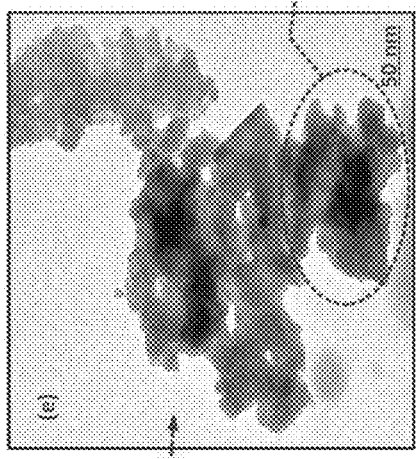
Figure 4D:
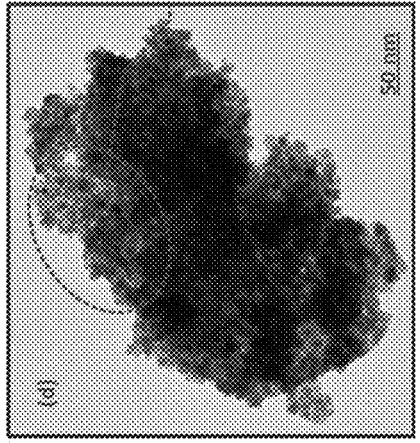

FIGS. 4D-4F are HRTEM images showing morphological representations of CDW porous activated carbon samples. FIGS. 4D and 4E show morphological studies of the CD 9, showing a nano-spongy layered graphitic structure of PAC materials. FIG. 4F shows a further magnification of the activated carbon samples. The graphitic nature of CDW porous activated carbon samples, when further magnified, depicts an agglomeration of very tiny spherical nanoporous-like morphology. Interconnected spherical PAC particles provide a unique open pore system with high active surface area, and it develops a short diffusion path for the electrolyte ions. Such morphological PAC promises the preparation of better electrode materials for supercapacitors. Hence the different morphological properties are effective in improving the electrochemical performance of the electrode materials for energy storage applications.

Example 6

Nitrogen Absorption/Desorption Isotherms

FIGS. 5A-5H are graphic depictions of nitrogen adsorption-desorption isotherms and pore size distribution plots. FIGS. 5A, 5C, 5E, and 5G show $N_2$ adsorption-desorption isotherms. FIGS. 5B, 5D, 5F and 5H show pore size distributions corresponding to the materials depicted in FIGS. 5A, 5C, 5E and 5G.

$N_2$ adsorption-desorption isotherms are routinely used to analyze the porous nature of the activated carbon samples. These isotherms are helpful in determining whether the microspores are classified as micro (below 2 nm), meso (2-50 nm) or macropores (above 50 nm). The isotherms of $N_2$ adsorption-desorption delivers the Brunauer-Emmett-Teller (BET) surface area values, and it explains the values of micro-, meso- and macropore by using Barret-Joyner-Halenda (BJH) method. FIGS. 5A, 5C, 5E, and 5F show the $N_2$ adsorption-desorption isotherms of the as-prepared porous activated carbon samples CD 9, CD 8, CD 7, and CD 6 prepared from the cattle dung waste. These Figures show a type I isotherm with small hysteresis loops of $H_4$ type, and the resulting characteristics explain all the samples (CD 6, CD 7, CD 8 and CD 9) should have microporous nature with a high amount of mesoporous volume. Textural parameters of CDW-PAC samples are summarized in Table 1. In Table 1, the parameters for pre-carbonized carbon are not given because PCC shows a very low BET surface area and lesser amount of porosity. Table 1 indicates that without the activation process and activation temperature, there is no creation of pores or pore development in the carbon matrix. In Table 1, the BET surface area values increases from CD 6 to CD 9, and it can be seen that the porosity of the cattle dung samples is significantly influenced by the activation temperatures. When the activation temperature increases from 600° C. to 900° C., the values of BET surface area also increase. The CD 9 sample shows a higher BET surface area (2457 $m^2/g$) with hierarchical porous structure than the other cattle dung porous activated carbon samples.

TABLE 1

Characteristics of CDW-derived PACs

| Sample (Cow Dung waste) | $S_{BET}{}^a$ ($m^2/g$) | $S_{micro}{}^b$ ($m^2/g$) | $S_{meso}{}^c$ ($m^2/g$) | $V_{micro}{}^d$ ($cm^3/g$) | $V_{meso}{}^e$ ($cm^3/g$) | $V_{Total}{}^f$ ($cm^3/g$) |
|---|---|---|---|---|---|---|
| CD 6 | 489 | 249 | 240 | 0.393 | 0.202 | 0.595 |
| CD 7 | 984 | 498 | 486 | 0.585 | 0.379 | 0.964 |
| CD 8 | 1860 | 984 | 876 | 0.682 | 0.487 | 1.169 |
| CD 9 | 2457 | 1293 | 1164 | 0.985 | 0.980 | 1.965 |

$^a$BET surface area.
$^b$Micropore surface area.
$^c$Mesopore surface area.
$^d$Micropore volume.
$^e$Mesopore volume.
$^f$Total pore volume.

During the heat treatment process, many bonds in the aromatic structures are incomplete and dangling, leading to the creation of molecular level internal and external pore structures and are developed on the carbon matrix present in the solid pre-carbonaceous material. The chemical activant ($H_3PO_4$) and heat treatment employ the random-ordered, imperfect aromatic sheets in the porous carbon matrix, and it brings out the incompletely saturated unpaired electrons. The disordered and well-arranged carbons are formed at four different activation temperatures (600, 700, 800 and 900° C.). The well-arranged carbon forms the stable graphitic structure, and it is in good agreement with the FIG. 3, while the disordered carbon forms turbostratic carbon structures. In addition, the chemical activation and heat treatment process expels out the bound volatiles from the carbon matrix, which easily departs over the surface and forms cracks in the stable structure. Hence, the porosity formation (micro-, meso-, and macropores) at different dimensions leads to the hierarchical porous carbon structures. The average pore size of the hierarchical porous activated carbon samples is increased when the activation temperature increases. The pore creation and enlargements are dependent upon the chemical activant and heat treatment employed. Hierarchical porous structure increases the total pore volume (1.965 $cm^3/g$), with huge pore diameter in the average pore size distribution graph (FIGS. 5B, 5D, 5F, and 5H), and is in agreement with the patterns shown in FIG. 3. The result indicates that more hierarchical pores in the carbon matrix develop the huge Helmholtz double-layer formation, and it enhances the specific capacitance in an EDLC device.

Figure 5A:
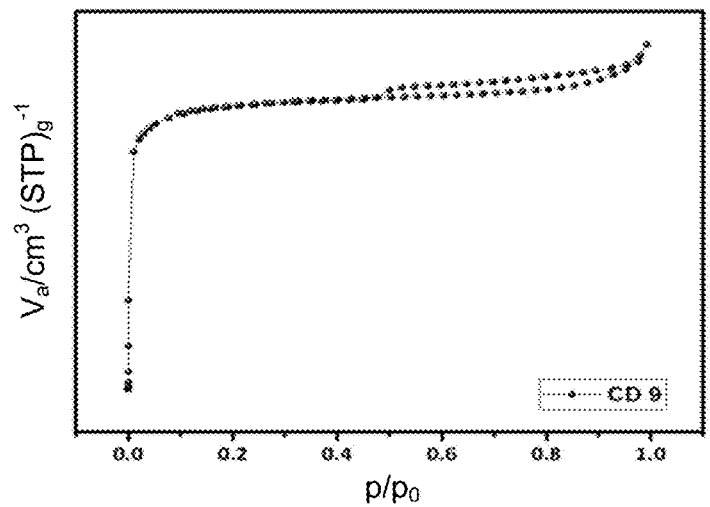
FIGS. 5A and 5B are plots showing adsorption/desorption isotherms and pore size distribution, respectively, for the porous activated carbon (PAC) sample CD 9.
Figure 5B:
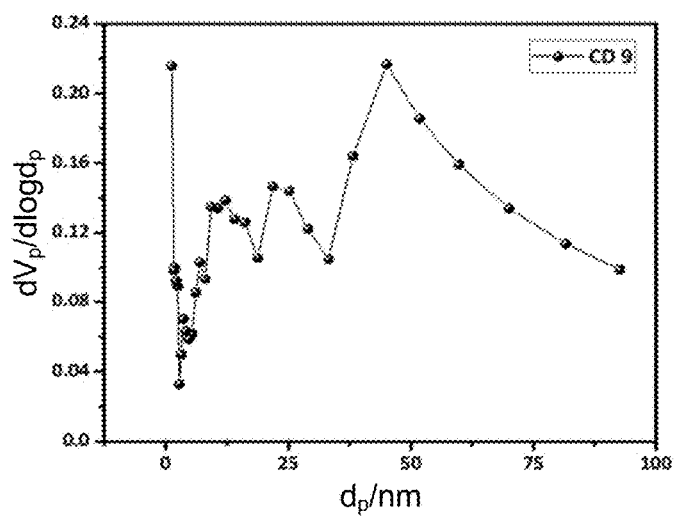
Figure 5C:
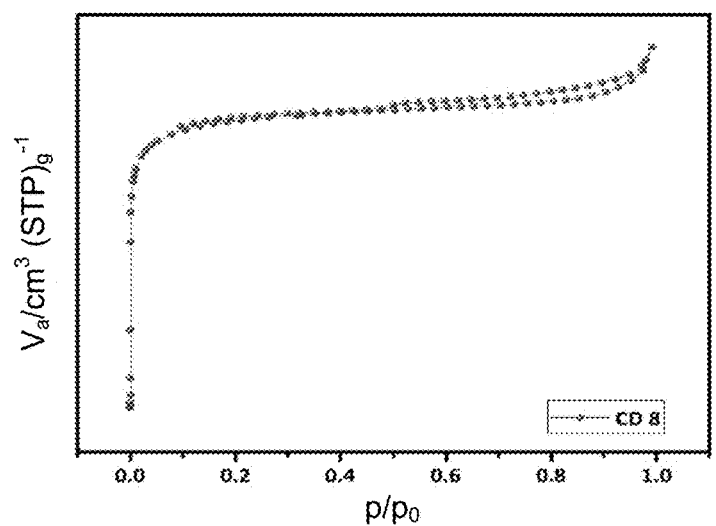
FIGS. 5C and 5D are plots showing adsorption/desorption isotherms and pore size distribution, respectively, for the porous activated carbon (PAC) sample CD 8.
Figure 5D:
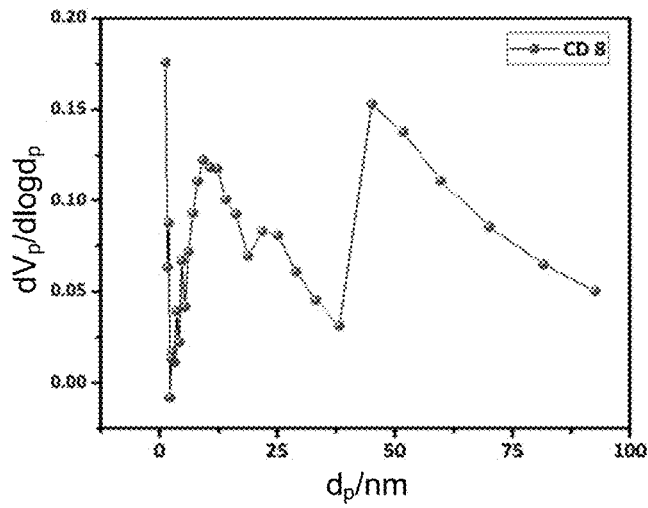
Figure 5E:
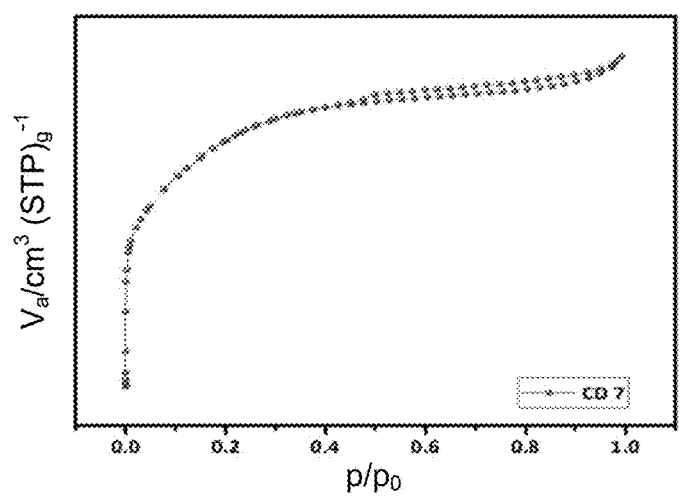
FIGS. 5E and 5F are plots showing adsorption/desorption isotherms and pore size distribution, respectively, for the porous activated carbon (PAC) sample CD 7.
Figure 5F:
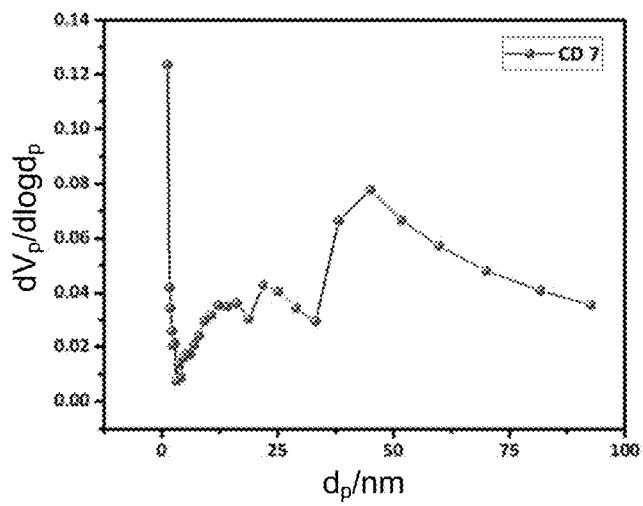
Figure 5G:
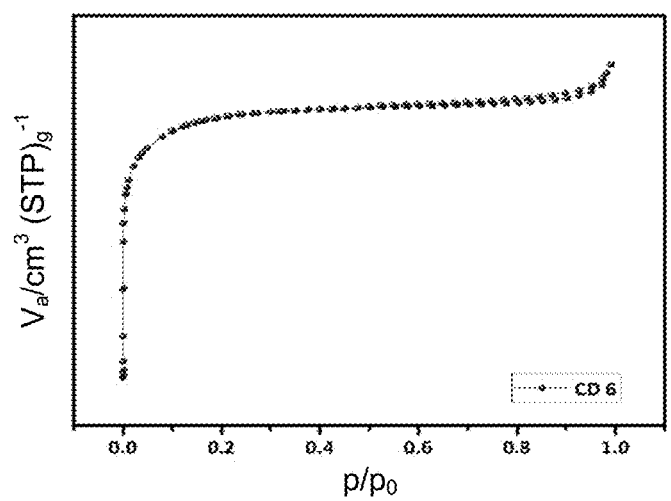
FIGS. 5G and 5H are plots showing adsorption/desorption isotherms and pore size distribution, respectively, for the porous activated carbon (PAC) sample CD 6.
Figure 5H:
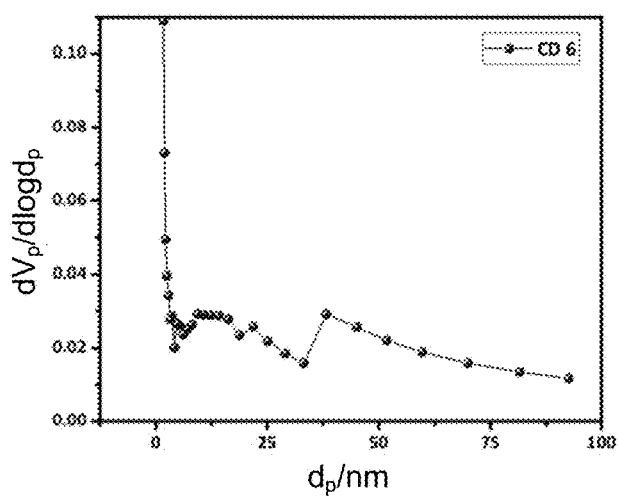

Corresponding relationships can be seen in the depictions of FIGS. 5C, 5E and 5G, and the corresponding depictions of FIGS. 5D, 5F and 5H.

Example 7

Electrochemistry of Sample Electrodes

Figure 6A:
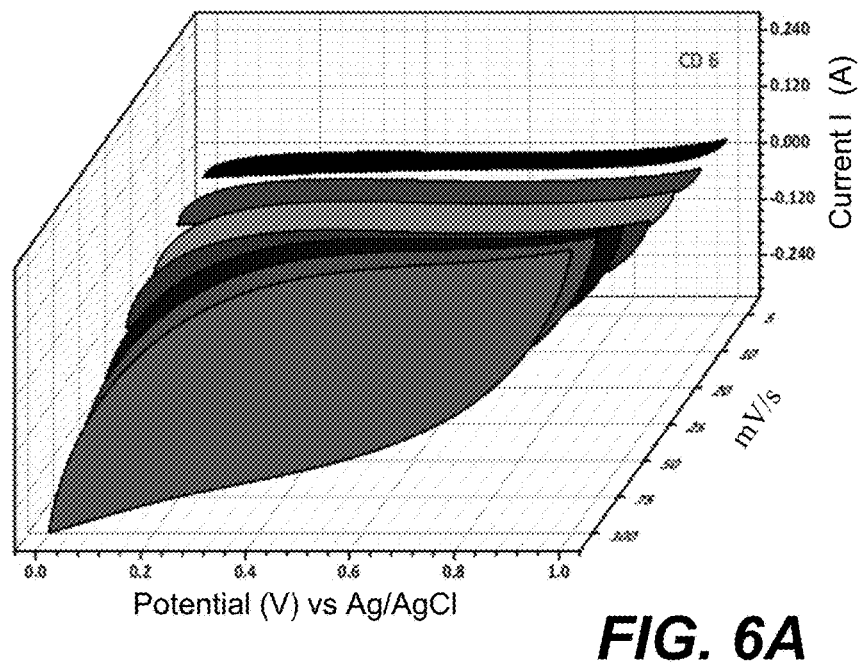
FIGS. 6A, 6B, 6C, and 6D are cyclic voltammograms of porous activated carbon (PAC) samples CD 6, CD 7, CD 8, and CD 9, respectively, at different scanning rates.
Figure 6B:
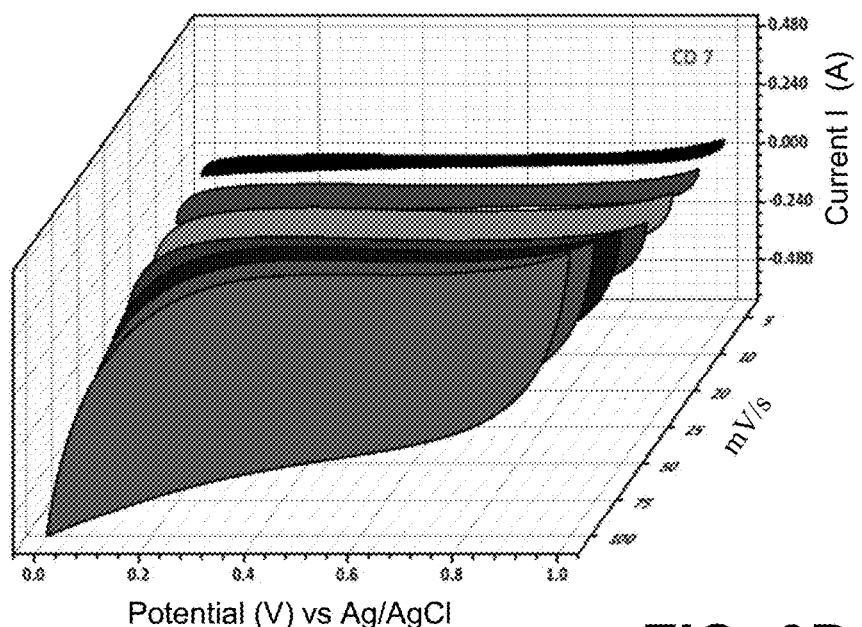
Figure 6C:
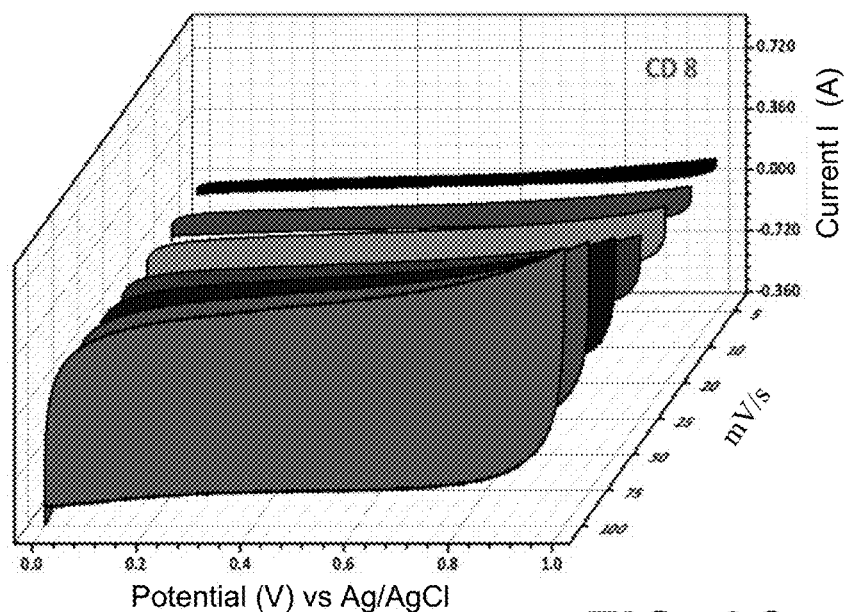
Figure 6D:
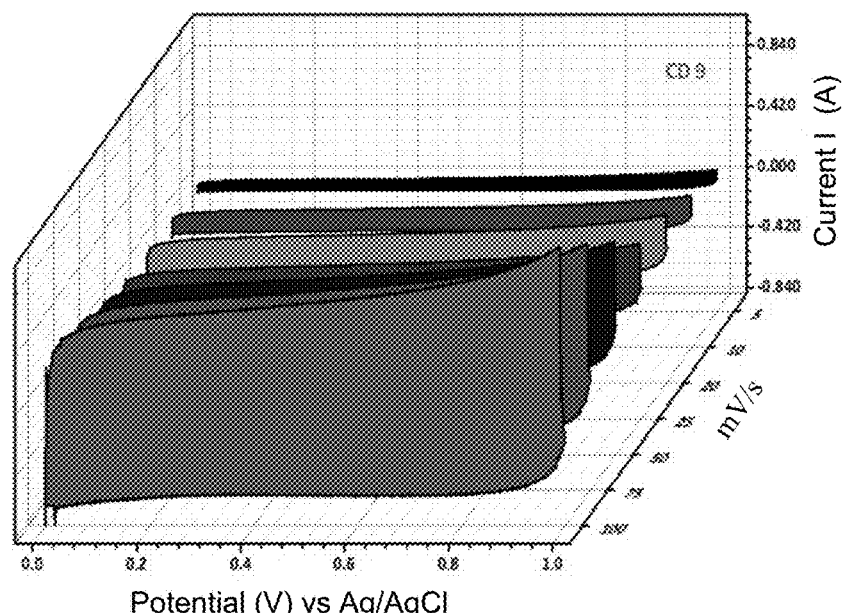
Figure 7A:
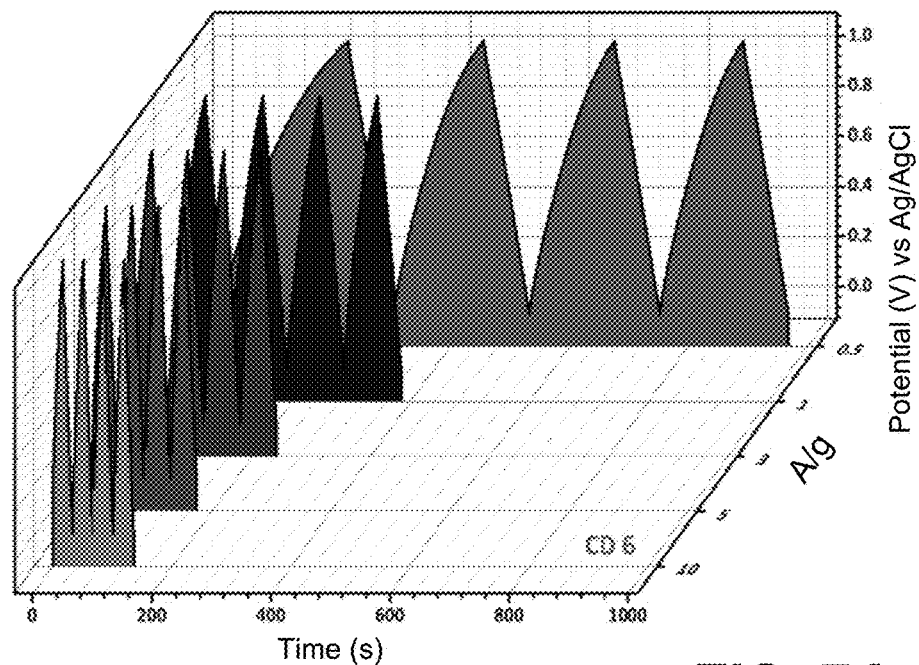
FIGS. 7A, 7B, 7C, and 7D are plots of galvanostatic charge-discharge (GCD) profiles of porous activated carbon (PAC) samples CD 6, CD 7, CD 8, and CD 9, respectively, at current densities of 0.5, 1, 3, 5, and 10 A/g.
Figure 7B:
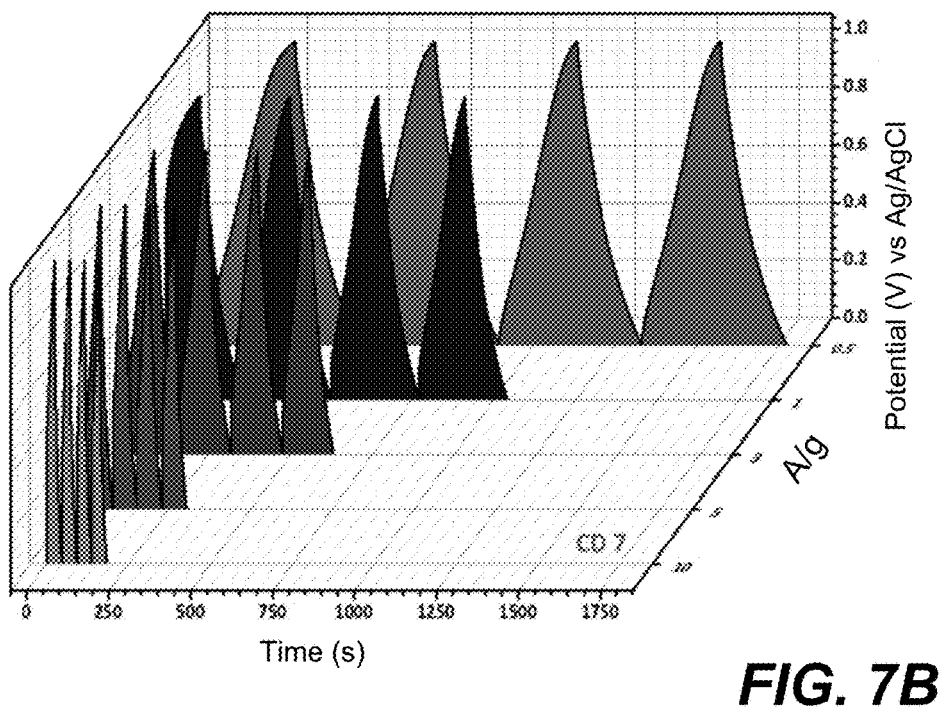
Figure 7C:
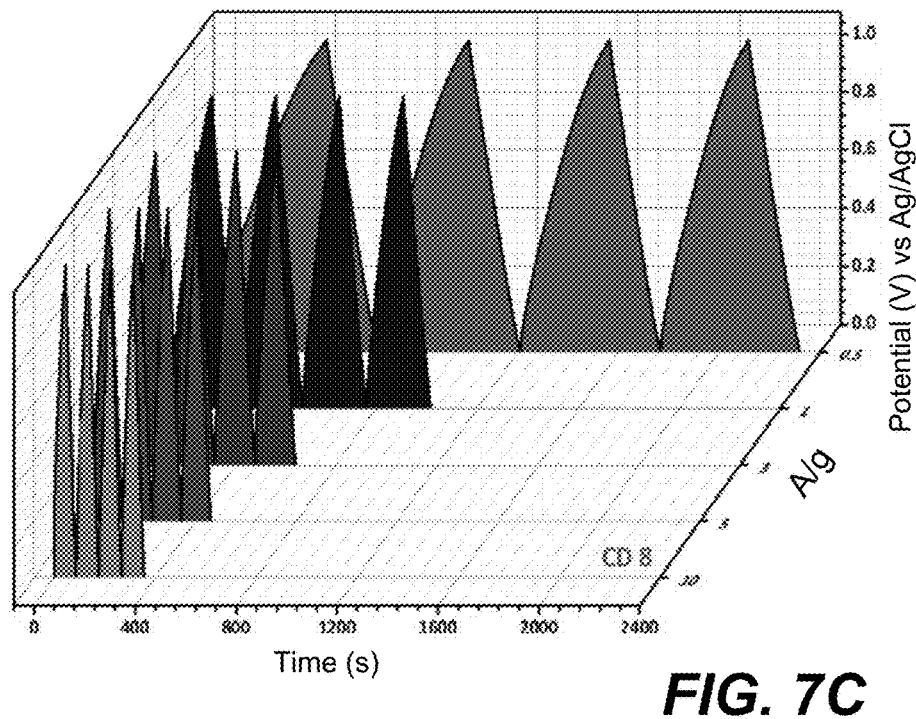
Figure 7D:
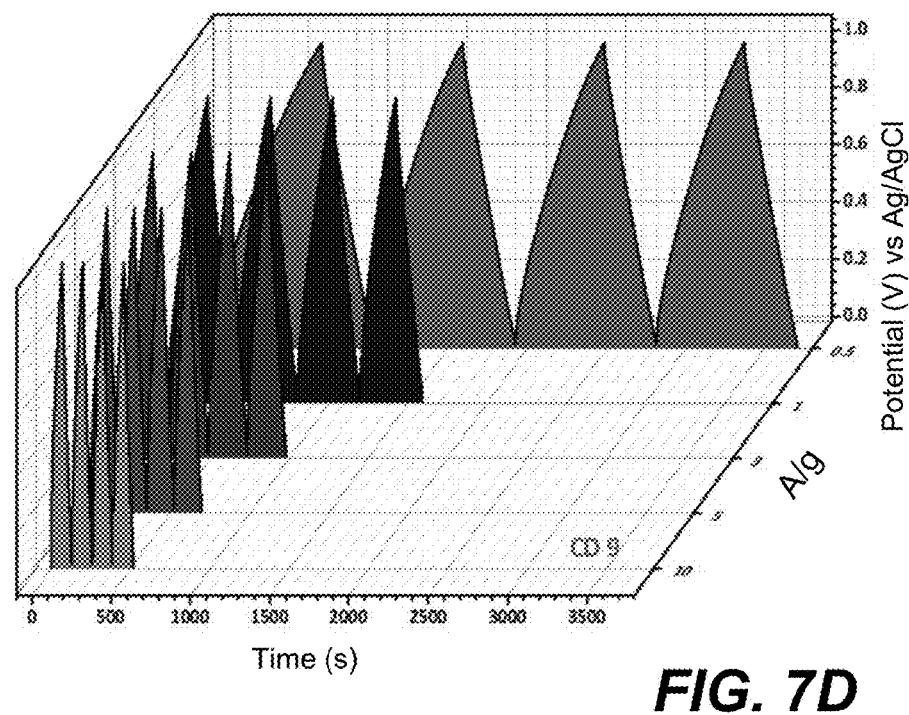

FIGS. 6A-6D are graphical depictions of cyclic voltammograms of cattle dung waste porous activated carbon samples at different scan rates (5, 10, 20, 25, 50, 75 and 100 mV/s) in 6M KOH with 0 to 0.98 V potential window. Cyclic voltammetry (CV) studies were used to test the specific capacitance of CD 6, CD 7, CD 8 and CD 9. The cyclic voltammograms show leaf-like shapes, or a quasi-rectangular shape for CD 6 and CD 7 samples, as seen in FIGS. 6A and 6B. CD 8 and CD 9 samples more closely present a rectangular shape in their patterns, as seen in FIGS.

6C and 6D. The area of the CV curve is increased from the CD 6 sample to the CD 9 sample, which depicts that the CD 9 sample is closer to the ideal behavior properties of electric double-layer capacitors (EDLCs). The specific capacitance (Cs) was calculated from the equation (1):

$$C_s = \int \frac{\Delta I}{2Vm(V_2 - V_1)} \text{ where } \Delta I = I_a - I_c \quad (1)$$

and where ΔI is the half of the integration of CV curve, $I_a$ is the anodic current, $I_c$ is the cathodic current, V is the scan rate, m is the mass of the active material, and $V_2-V_1$ is the potential difference between the CV curve.

Using the CV curve, the specific capacitance can be calculated to render the values listed in Table 2. From Table 2, the specific capacitance of CD 6, CD 7, CD 8 and CD 9 is 148, 215, 294 and 347 F/g at 5 mV/s, respectively.

TABLE 2

Specific capacitance calculated from cyclic voltammetry

| | Specific capacitance calculated from CV (F/g) | | | | | | |
|---|---|---|---|---|---|---|---|
| Sample | 5 mV/s | 10 mV/s | 20 mV/s | 25 mV/s | 50 mV/s | 75 mV/s | 100 mV/s |
| CD 6 | 148 | 123 | 111 | 98 | 67 | 45 | 24 |
| CD 7 | 215 | 202 | 187 | 151 | 118 | 93 | 75 |
| CD 8 | 294 | 252 | 216 | 195 | 164 | 133 | 108 |
| CD 9 | 347 | 305 | 288 | 247 | 186 | 156 | 124 |

It is observed that the specific capacitance increases from CD 6 to CD 9. The CD 9 sample shows high BET surface area and higher specific capacitance than CD 6, CD 7 and CD 8 samples because, in the preparation process, the activation temperature increases the creation and development of new pores, which later becomes gradually higher. Hence, increased activation temperature also increases the BET surface area values gradually with more pores in hierarchical manner.

The hierarchical porous structure helps to develop the highly static Helmholtz double-layer and enhances the specific capacitance. The hierarchical porous structure of CD 9 is responsible for the high specific capacitance, which simplifies the electrolyte ions retrieving the interior surfaces of the electrode and leads to the enlarged charge storage system. The CV graphs suggest a higher current response for CD 9 sample, which has a higher specific capacitance than the other porous activated carbon samples. The specific capacitance results also coincide with the BET surface area values as listed in Table 1.

Example 8

Galvanic Charge-Discharge Studies

FIGS. 7A-7D are graphical depictions of galvanostatic charge-discharge (GCD) profiles of cyclic voltammograms of cattle dung waste porous activated carbon samples CD 6, CD 7, CD 8 and CD 9 at different current densities (0.5, 1, 3, 5 and 10 A/g). The GCD analysis is carried out to confirm the specific capacitance values as a technique to calculate the specific capacitance from charge-discharge rate. The GCD profiles of CD 6, CD 7, CD 8 and CD 9 samples at the different current densities were tested by the three-electrode system in 6M KOH aqueous electrolyte. Hence, the GCD profile was plotted as time in seconds (s) versus a fixed potential (V).

All the depictions for the PAC CD samples rendered triangular shapes, and the GCD profiles are symmetric and linear. The symmetric and linear profiles indicate that the samples have reversible charging and discharging properties. This depicts a nearly ideal capacitive behavior of electric double-layer capacitors. Using the GCD profiles, the specific capacitance was calculated from equation (2):

$$C_s = \frac{I \times \Delta t}{m \times \Delta V} \quad (2)$$

where I is the current density (A/g), Δt is the time of charge-discharge in GCD profile(s), m is the mass of the active material in the working electrode (g), and ΔV is the working potential window in GCD profiles (V).

The calculated GCD values are tabulated in Table 3. From Table 3, the GCD values of CD 6, CD 7, CD 8 and CD 9 samples show 146, 213, 291 and 347 F/g at low current density (0.5 A/g), and at high current density (10 A/g), the GCD values show very low specific capacitance as 22, 78, 104 and 122 F/g. At high current densities, the smaller $C_s$ value can be attributed to slower diffusion and migration of ions through the electrodes and electrolyte interface. At lower current densities, the $C_s$ value is higher, which is depicting faster diffusion and migration of ions in electrode and electrolyte interface. Accordingly, the tabulated GCD values of Table 3 are in good agreement with the calculated CV values.

TABLE 3

Specific capacitance calculated from galvanostatic charge/discharge (GCD)

| | Specific capacitance calculated from GCD (F/g) | | | | |
|---|---|---|---|---|---|
| Sample | 0.5 A/g | 1 A/g | 3 A/g | 5 A/g | 10 A/g |
| CD 6 | 146 | 108 | 77 | 43 | 22 |
| CD 7 | 213 | 189 | 142 | 115 | 78 |
| CD 8 | 291 | 248 | 202 | 156 | 105 |
| CD 9 | 347 | 279 | 215 | 174 | 122 |

Example 9

Electrochemical Impedance Spectroscopy (EIS) Testing of Electrodes

Figure 8A:
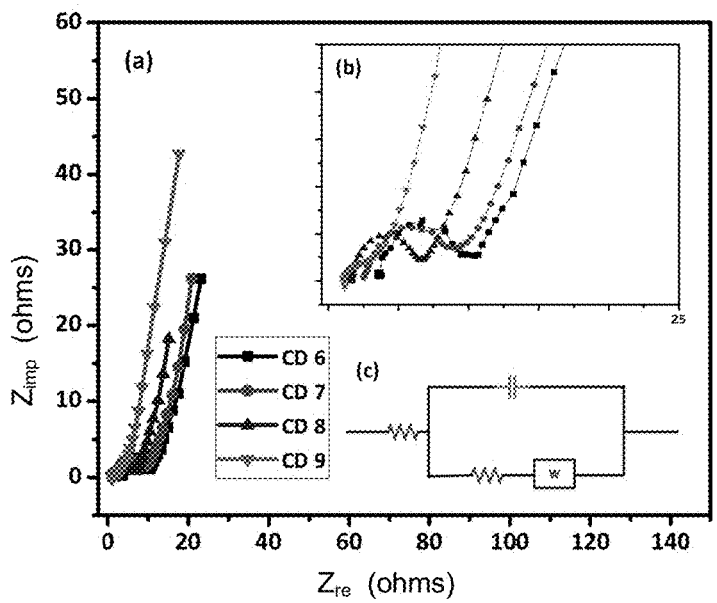
FIG. 8A is a Nyquist plot for electrodes made from the porous activated carbon samples CD 6, CD 7, CD 8, and CD 9.
Figure 8B:
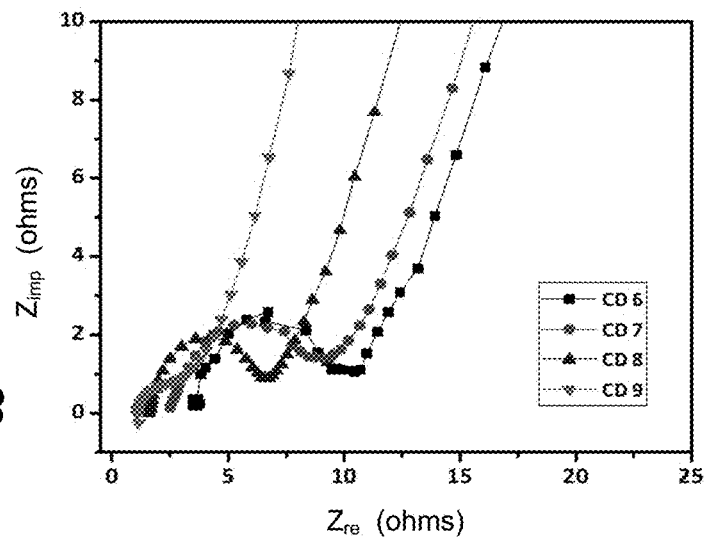
FIG. 8B is an enlargement of the Nyquist plot of FIG. 8A (identical to the inset plot of FIG. 8A, but on a larger scale).
Figure 8C:
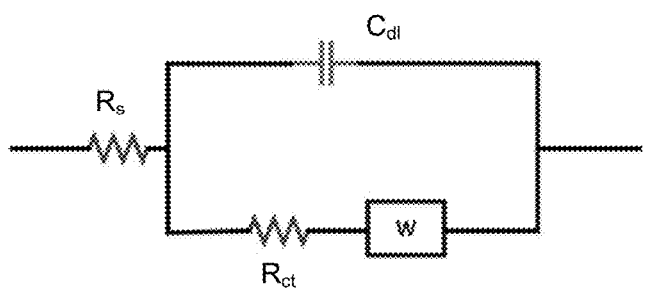
FIG. 8C is the Warburg circuit for the impedances plotted in FIGS. 8A and 8B (identical to the inset circuit in FIG. 8A).

EIS is a powerful technique to examine the capacitive performance of the electrochemical cells, and is also used to check the ability of the porous activated carbon materials to store electrical energy. We conclude the calculated specific capacitance results from CV and GCD by using EIS tests. In this EIS technique, it is preferable to determine the resistance and double-layer capacitance of the as-prepared porous activated carbon electrodes from cow dung waste. The Nyquist plot is plotted between the real ($Z_{re}$) and imaginary ($Z_{im}$) impedance part in ohms, as shown in FIG. 8A. The Nyquist plot was prepared using 6M KOH electrolyte in the frequency range of 1 mHz to 100 kHz with 5 mV AC voltage. FIG. 8A shows the EIS tests, and depicts the Nyquist plot of CD 6, CD 7, CD 8 and CD 9 porous activated carbon electrodes. In general, a Nyquist plot produces a semicircle with a straight line at 900. The semicircle indicates that the charge transfers resistance ($R_{ct}$) between the electrode and electrolyte interface, and the straight line at 900 gives the double-layer capacitance ($C_{dl}$). $R_s$ is the solution or internal resistance present in aqueous 6 M KOH electrolyte. W is the Warburg resistance obtained-between the $C_{dl}$ and $R_{ct}$. The electronic resistance of Rct and Rs includes the equivalent series resistances (ESR). Finally, the ohmic resistance and double-layer capacitance are perfectly displayed in the Nyquist plot, as shown in the enlarged inset graph of FIG. 8B, which is fitted with an open circuit of the Nyquist plot, as depicted in the enlarged inset diagram of FIG. 8C. Using the low frequency data of the Nyquist plot, the ohmic resistance double-layer capacitance can be evaluated and is calculated by equations (3) and (4).

$$ESR = R_{ct} - R_s \qquad (3)$$

$$C_{dl} = \frac{-1}{2\pi f Z_{im}} \qquad (4)$$

where $C_{dl}$ is the double-layer capacitance, f is the low frequency data and $Z_{im}$ is the imaginary part of the impedance.

During the EIS tests, the open circuit is fixed as a standard value, which is used to compare the results obtained from the as-prepared porous activated carbon electrodes, and the results are tabulated in the Table 4. In FIG. 8A, the CD 9 electrode shows the small semicircle and a straight line at 90° better than the other porous activated carbon electrodes, which characterizes the property of low resistance with high double-layer capacitance. The results of the CD 9 electrode depicts the fast diffusion of ions between the electrode and electrolyte interface, which could produce a highly static Helmholtz double layer, and it enhances the high capacitance. Evidently, the double-layer capacitance of EIS as listed in Table 4 is well matched with the specific capacitance of the CV and GCD results.

TABLE 4

Results of PAC samples tested by EIS

| Sample | $R_s$ (Ω) | $R_{ct}$ (Ω) | ESR (Ω) | W (Ω) | $C_{dl}$ (F/g) |
|---|---|---|---|---|---|
| CD 6 | 1.11 | 7.65 | 6.44 | 1.070 | 108 |
| CD 7 | 1.36 | 4.78 | 3.30 | 0.767 | 175 |
| CD 8 | 0.57 | 3.17 | 2.19 | 0.305 | 294 |
| CD 9 | 0.35 | 1.13 | 1.37 | 0.033 | 342 |

Example 10

Figure 9A:
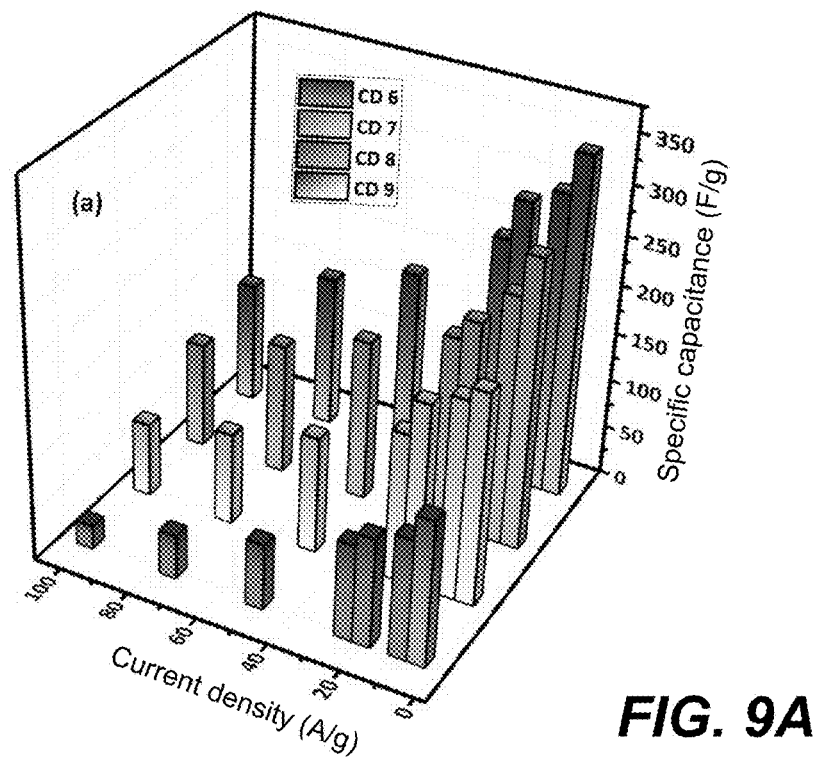
FIG. 9A is a plot of scan rate vs. specific capacitance for electrodes made from the porous activated carbon samples CD 6, CD 7, CD 8, and CD 9 at scan rates of 5, 10, 20, 25, 50, 75, and 100 mV/s.
Figure 9B:
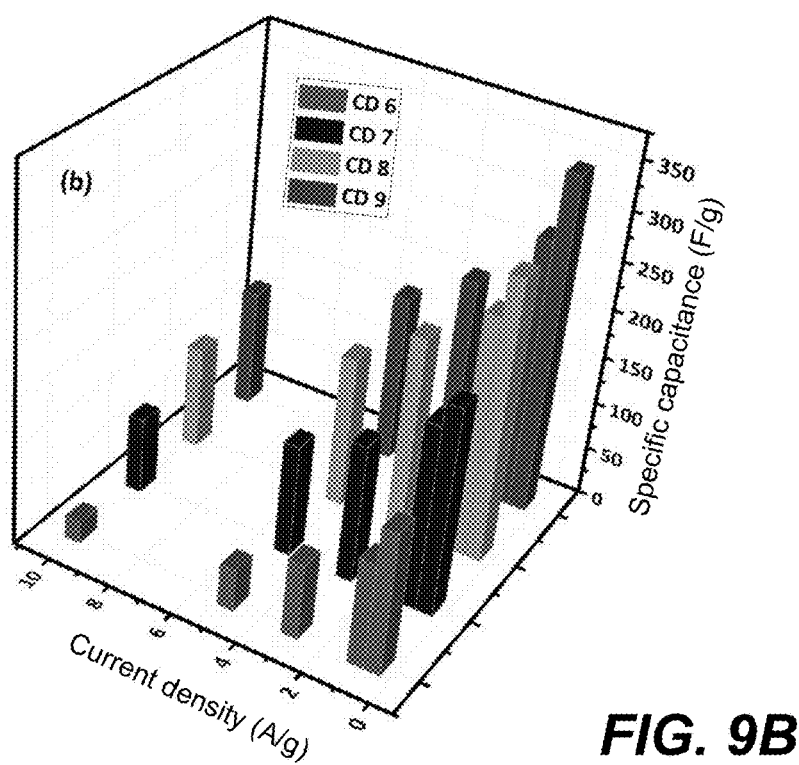
FIG. 9B is a plot of current density (A/g) vs. specific capacitance (F/g) for electrodes made from the porous activated carbon samples CD 6, CD 7, CD 8, and CD 9 at current densities of 0.5, 1, 3, 5, and 10 A/g.

Relation of Specific Capacitance to Scan Rate and Current Density in Sample PAC Electrodes FIGS. 9A and 9B are graphical depictions of specific capacitance for the different sample PAC electrodes. FIG. 9A is a depiction of specific capacitance at different scan rates. FIG. 9B is a depiction of specific capacitance at the different current density rates. In supercapacitors, tests of CV and GCD are significant, and are used to calculate the $C_s$ (specific capacitance) value. In the tests, the significant function is the effect on performance that scan rate plays in CV and current density plays in GCD. FIG. 9A shows the scan rate capability (mV/s) versus specific capacitance (F/g) of CD 6-CD 9 electrodes at different scan rates of 5, 10, 20, 25, 50, 75 and 100 mV/s. From FIG. 9A, it can be seen that when scan rate increases, specific capacitance is gradually decreased. During the gradual increase from low to high scan rate, the electrolytic ions do not enter faster to the pores of the active material in the electrode. The result depicts the unstable form of static Helmholtz double layer, and then the remaining restricted ions form solvated electrolyte ions in the electrolyte solution present in the electrochemical cell, which gives a low $C_s$ value at high scan rates and high $C_s$ value at low scan rates. CD 9 shows a high $C_s$ value due to fast transport of electrolyte ions into the electrode interface.

FIG. 9B shows the current density (A/g) versus specific capacitance (F/g) of CD 6-CD 9 electrodes at different current densities, such as 0.5, 1, 3, 5 and 10 A/g. In GCD tests, the charge-discharge process is significant in developing a better electrode performance in device fabrication. The GCD profiles of different current densities help provide an understanding of the mass of electrode material, which is valuable in choosing or optimizing electrodes for supercapacitors. From FIG. 9B, it is observed that the current densities decrease when the specific capacitance increases due to the pore size effect, and it varies at different ampere ratings (0.5, 1, 3, 5 and 10 A/g) at the same mass (4 mg) of the active material. At low current density, the charge-discharge profile time duration of the CD 9 electrode depicts a high $C_s$ value. In contrast, at high current density, the charge-discharge profile time duration of the CD 9 electrode depicts a low $C_s$ value.

Figure 10:
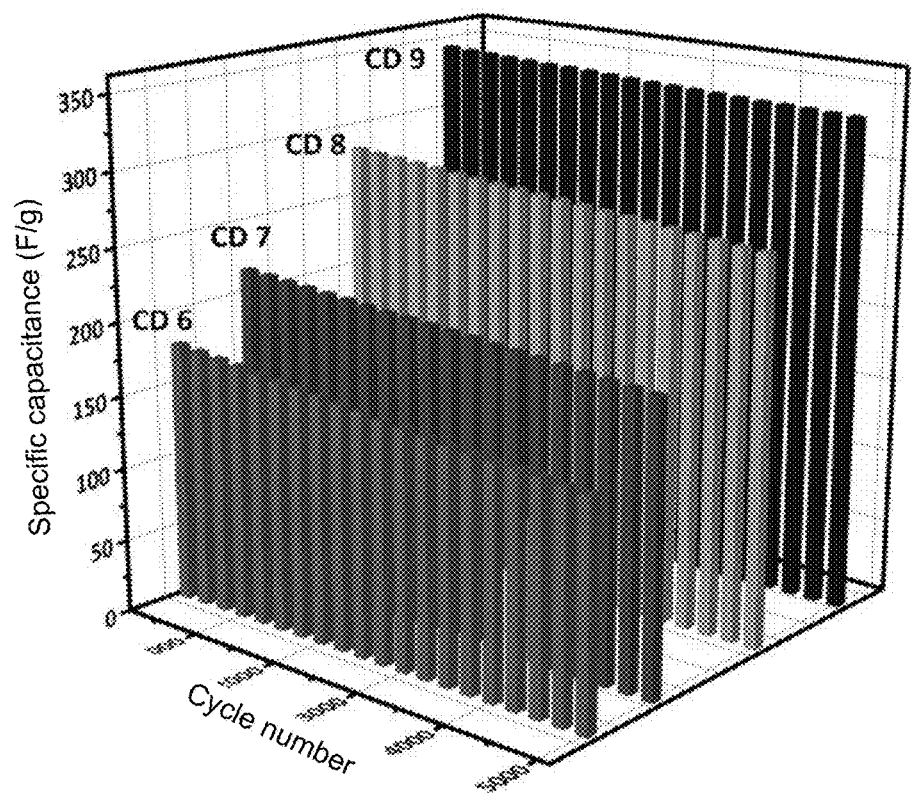
FIG. 10 is a plot of specific capacitance at different cycle numbers, showing cyclic stability tests for the porous activated carbon samples CD 6, CD 7, CD 8, and CD 9.

FIG. 10 is a graphical depiction of specific capacitance at different cycle numbers. In EDLCs, the main advantage is the long-term cycle duration, and therefore the test for long-term cyclic stability is significant for the as-prepared CDW-PAC electrodes. FIG. 10 shows the cyclic stability of CD 6, CD 7, CD 8 and CD 9 samples tested at low current density of 0.5 A/g for 5000 cycles within a potential window from 0 to 0.98 V in 6 M KOH aqueous electrolyte using a three-electrode system. As seen in FIG. 10, sample CD 9 indicates that no specific capacitance loss occurs after 5000 cycles, and samples CD 6, CD 7 and CD 8 show small loss in specific capacitance at the time of reaching 3500 cycles. The capacitance retention of CD 9 is 95%, which strongly exhibits the excellent electrochemical stability of CD 9 electrode material. The excellent performance is closely correlated to the hierarchical nature of the CD 9 PAC electrode, as well as its high surface area and reasonable pore size distribution.

Overall, the as-prepared CD porous activated carbon electrodes are tested to identify the better electrochemical performance with high specific capacitance and long-term cyclic stability. From the results, it is observed that the CD 9 electrode showed higher specific capacitance of 347 F/g than CD 6 (148 F/g), CD 7 (215 F/g) and CD 8 (294 F/g), and hence the CD 9 electrode material was selected for supercapacitor fabrication. A new model device was fabricated under a systematic procedure, which can be described as a flexible-type symmetric supercapacitor (FT-SS), shown in FIG. 2 and described previously. The CD 9 PAC is the second layer in this configuration. The third layer is the 6M KOH electrolytic gel, which act as an electrolyte. Between the anode and cathode electrodes, a polymer (polytetrafluoroethylene membrane) layer is introduced. The polymer functions as a separator. The 6M KOH electrolytic gel was made when the separator was soaked for 12 hours in 6M KOH electrolyte. Similarly, the cathode electrode is also made like a three-layer anode electrode.

Figure 11A:
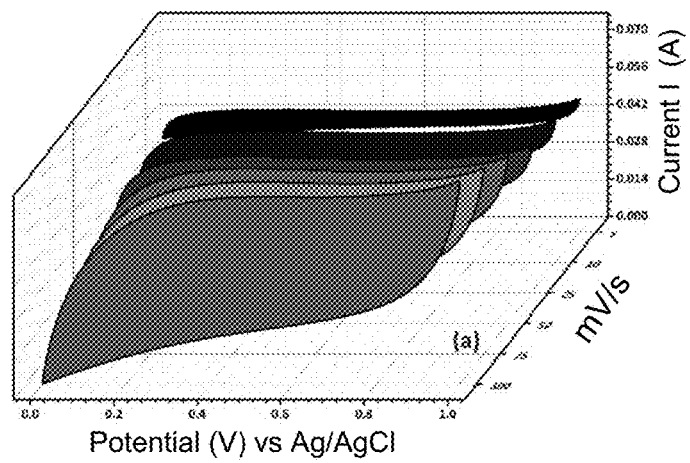
FIG. 11A displays cyclic voltammograms of FT-SS supercapacitors at scanning rates between 5 and 100 mV/s.
Figure 11B:
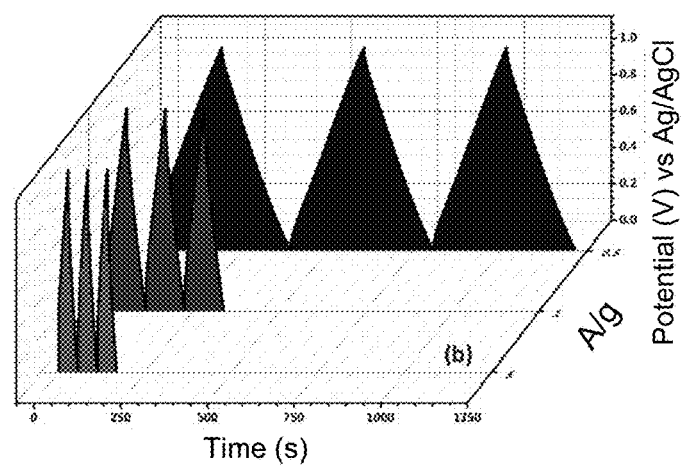
FIG. 11B displays plots of GCD profiles of FT-SS supercapacitors at current densities of 0.5, 1, and 5 A/g.
Figure 11C:
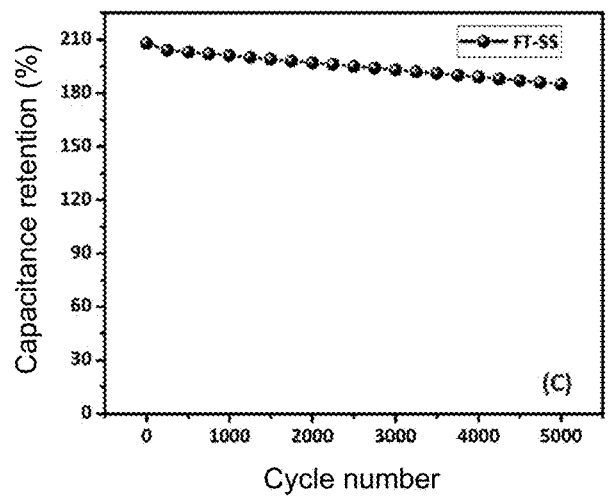
FIG. 11C is a plot of capacitance retention as a function of cycle number of an FT-SS supercapacitor.

FIGS. 11A and 11B are graphical depictions showing the electrochemical ability of the FT-SS. FIG. 11A shows current as a function of voltage and voltage density. FIG. 11B shows voltage as a function of time. FIG. 11C is a graphical depiction of capacitive retention over a number of capacitive storage cycles.

The FT-SS is made as a symmetric supercapacitor device. The FT-SS was tested for electrochemical ability, as depicted in FIGS. 11A, 11B and 11C. The tests comprised CV, GCD and cyclic stability, and used a two-electrode system. As depicted in FIG. 11A, the CV curve of the FT-SS device presents a quasi-rectangular shape, which delivers a desired behavior performance of supercapacitors, and the calculated $C_s$ value is 208 F/g at 5 mV/s. From FIG. 11B, it can be observed that the GCD profiles of charge-discharge segments shows a near-perfect triangle, but the calculated GCD $C_s$ values (207 F/g at 0.5 A/g) are similar to the CV $C_s$ values.

FIG. 11C shows the cyclic stability, and it is carried out for PAC CD 9 electrode up to 5000 cycles, which demonstrates 91% capacitance retention over the 5000 cycles depicted. The FT-SS device provided lower specific capacitance than the individually checked CD 9 electrode in three-electrode system. The lower $C_s$ value is due to the solid-type model in the two-electrode system. The CD 9 electrode was in liquid form using 6M KOH electrolyte in the electrochemical testing setup of Example 7, whereas the FT-SS supercapacitor used the gel form of 6M KOH electrolyte with a PTFE separator. Comparatively, the FT-SS device ion diffusion is slower than the individually checked CD 9 electrode, which delivers a lower $C_s$ value.

It is to be understood that the method of making a supercapacitor using porous activated carbon from cow dung is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of making a supercapacitor using porous activated carbon from cow dung, comprising the steps of:
   heating cow dung waste at 400° C. for 4 hours under vacuum to form pre-carbonized carbon (PCC);
   impregnating the pre-carbonized carbon with concentrated ortho-phosphoric acid at a ratio of 4:1 PCC:acid by weight to form a slurry;
   after 12 hours, filtering the slurry and drying the acidified carbon for 24 hours at 80° C. to obtain dried acidified carbon;
   heating the dried acidified carbon at 900° C. under vacuum to obtain porous activated carbon made from cow dung;
   mixing a binder and an organic solvent with the porous activated carbon to obtain a paste;
   coating a first portion of the paste onto an inner side of a first conductive metal foil, the foil also having an outer side;
   drying the first portion of the paste so that the paste containing the porous activated carbon adheres to the inner side of the first conductive metal foil;
   attaching a first terminal to the outer side of the first conductive metal foil to form an anode;
   repeating the mixing, coating, drying, and attaching steps with a second portion of the paste, a second conductive metal foil, and a second terminal to form a cathode; and
   inserting an aqueous electrolyte and a separator between the anode and the cathode to form the supercapacitor.

2. The method of making a supercapacitor according to claim 1, wherein the separator comprises a polymer membrane.

3. The method of making a supercapacitor according to claim 1, wherein the separator comprises a membrane made of polytetrafluoroethylene.

4. The method of making a supercapacitor according to claim 1, wherein the step of inserting an aqueous electrolyte and a separator comprises the steps of soaking a polymer membrane having opposing sides in an aqueous electrolyte for 12 hours to form an electrolytic gel on the opposing sides of the membrane, and then inserting the membrane between the anode and the cathode.

5. The method of making a supercapacitor according to claim 4, wherein the aqueous electrolyte comprises 6M potassium hydroxide.

6. The method of making a supercapacitor according to claim 5, wherein the polymer membrane comprises a membrane made of polytetrafluoroethylene.

7. The method of making a supercapacitor according to claim 1, wherein the binder comprises poly(vinylidene) difluoride.

8. The method of making a supercapacitor according to claim 7, wherein the organic solvent comprises N-methylpyrrolidinone.

9. The method of making a supercapacitor according to claim 8, wherein said mixing step further comprises mixing acetylene black with the binder, the organic solvent, and the porous activated carbon in order to lower electrical resistance introduced by the binder and the organic solvent.

10. The method of making a supercapacitor according to claim 1, wherein the conductive metal foil comprises foil made of nickel.

11. A method of making a supercapacitor using porous activated carbon from cow dung, comprising the steps of:
    converting cow dung waste to porous activated carbon (PAC);
    coating the porous activated carbon onto facing sides of an anode and a cathode;
    disposing an aqueous electrolyte against the PAC-coated facing sides of the anode and the cathode; and
    placing a polymer membrane between the PAC-coated facing sides of the anode and the cathode to maintain aqueous electrolyte in contact with both of the facing sides.

12. The method of making a supercapacitor according to claim 11, wherein the aqueous electrolyte comprises 6M potassium hydroxide.

13. The method of making a supercapacitor according to claim 11, wherein the polymer membrane comprises a membrane made of polytetrafluoroethylene.

14. The method of making a supercapacitor according to claim 13, wherein the polymer membrane has opposite sides and said aqueous electrolyte comprises a gel disposed on the opposite sides of the polymer membrane.

* * * * *